United States Patent [19]
Kaiser

[11] 3,841,851

[45] Oct. 15, 1974

[54] PROCESS AND APPARATUS FOR THE GASIFICATION OF ORGANIC MATTER

[76] Inventor: Elmer Robert Kaiser, 7 Kaateskill Pl., Scarsdale, N.Y. 10583

[22] Filed: Feb. 12, 1974

[21] Appl. No.: 441,762

[52] U.S. Cl. ...................... 48/111, 48/202, 48/206, 48/209
[51] Int. Cl. ............................................. C10j 3/00
[58] Field of Search ............ 48/202, 203, 206, 209, 48/210, 62, 63, 69, 76, 78, 86, 111; 23/288 G

[56] References Cited
UNITED STATES PATENTS

| | | | |
|---|---|---|---|
| 863,817 | 8/1907 | Whitman | 48/69 |
| 2,699,384 | 1/1955 | Peery et al. | 48/69 |
| 2,772,954 | 12/1956 | Jequier | 48/202 |
| 3,729,298 | 4/1973 | Anderson | 48/209 |

*Primary Examiner*—S. Leon Bashore
*Assistant Examiner*—Richard Pace
*Attorney, Agent, or Firm*—Brumbaugh, Graves, Donohue & Raymond

[57] ABSTRACT

A process for converting solid fuels, particularly the organic matter of solid waste alone or supplemented by solid or liquid fuels, into combustible gases by thermal decomposition with gaseous oxygen. An oxygen-containing gas, particularly gaseous oxygen with or without minor amounts of other gases, such as nitrogen, argon, and steam, is directed into an ignited fuel bed in a manner that will convert the organic matter into a gas and will cause the inorganic matter to melt and will form a central cavity in the fuel bed. The molten inorganic matter is removed from the process in solid form, principally granulated. The gases and vapors are heated in a second chamber to continue the chemical reactions for improving the gas and for decreasing the amount of ungasified matter. The product gases may be used raw for the firing of nearby furnaces, or may be cleaned of undesirable components by conventional means, such as scrubbing, condensation, desulfurization, etc.

The process has the dual function of (1) converting low-grade waste and fuel into a gas having utility as a clean fuel and as a synthesis gas, and (2) disposing of solid wastes and waste oils. The process will assist in meeting the energy crisis by utilizing domestic resources of organic matter and converting them into a gas that will supplement available fuel gas.

26 Claims, 13 Drawing Figures

PROCESS AND APPARATUS FOR THE GASIFICATION OF ORGANIC MATTER

BACKGROUND

Solid waste that originates in urban communities is normally collected by trucks and is taken to landfill areas for burial, or is taken to incinerators where it is destroyed by burning. In the former case the resource is wasted; in the latter case the heat is released but is usually wasted to the atmosphere. Incinerators are a source of air and water pollution, which must be limited to acceptable levels by heavy expenditures for control equipment. The solid residue from incineration is a mixture of burned metal, glass, clinker, fine ash, and organic matter, which is buried.

Land areas available and suitable for the burial of solid wastes are rapidly becoming unavailable near many urban areas. Transportation of solid wastes from the originating community to another jurisdiction where land is available is costly and is generally opposed by the prospective receiving community.

Sorting and recycling of waste materials have merit but are limited in potential because of contamination of paper by food wastes, contamination of metals by organic coatings, mixture of colors of glass, and the relatively low cost of virgin materials.

The conversion of solid fuels, such as coke, anthracite, and bituminous coal, to gas in thick fuel beds blown by air, air with steam, and oxygen with or without steam are old in the art. Fuel is charged from above to maintain the prescribed depth of fuel bed. The fuel is of sufficient particle size so as to provide a porous structure for the passage of air, oxygen, steam and gas from bottom to top of the bed. Because some bituminous coals soften and swell above 725°F, and became semi-fluid for an interval of up to about 150°F, after which the coal becomes solid again, it was found necessary to provide a stirring mechanism for the upper part of the fuel bed. The purpose of the stirrer was to maintain porosity of plastic coal, while at the same time maintaining a relatively level upper surface of the fuel bed.

By the addition of steam with the air supplied through the grate under the fuel bed, ash released from the fuel was prevented from fusing into large masses, or into liquid slag, which the gas producers were not equipped to handle. In newer types of gas producers, in which oxygen was supplied instead of air, the ash readily melted at the higher temperatures and could be drained off as slag. Highly preheated air will also cause ash to become molten, as in iron blast furnaces, which are a form of gas producer.

The product gas from producers that are old in the art consisted of a mixture of $CO_2$, $CO$, $H_2$, $H_2S$, $N_2$, $C_2H_4$, $C_2H_6$, $CH_4$ and a variety of condensible tars, oils, heavy gases, soot, fly ash, and water vapor, in the main. By substituting gaseous oxygen, or oxygen-enriched air, for ambient air, the proportion of nitrogen in the product gas was reduced and the calorific value of the gas was enhanced.

To produce a high ratio of combustible gases to noncombustible gases in the product gas it is necessary to maintain a fuel bed of controlled and uniform porosity, without large channels or non-porous zones. Oxidant gas from below will pass upward through large channels and will burn combustible gases there. Conversely, oxidant gases will be unable to penetrate tight formations, thereby reducing the effective volume and cross-sectional area of the fuel bed. This problem would be especially acute in a gas producer charged with refuse containing corrugated paper boxes, bundled newspaper, tires, pieces of timber and other large objects that have large nonporous surfaces.

OBJECTS

It is an object of this invention to increase the supply of fuel gas and synthesis gas by utilizing organic wastes, lowgrade coals and oils. It is another object of this invention to provide a method for refuse disposal with little or no air pollution, and without landfilling of residue or refuse. A third object of the invention is the utilization of fuels containing sulfur and chlorine, and converting these fuels into a gas of minimum volume from which compounds of sulfur and chlorine can be removed by known and economical means prior to final combustion of the product gas.

SUMMARY OF INVENTION

These and other objects, which will become apparent from the detailed disclosure and claims to follow, are achieved by the present invention, one aspect of which comprises:

A process which utilizes solid fuels, or which disposes of refuse and utilizes combustible organic matter mixed therewith, in either case by converting it to useful gaseous products and granular fused residue, comprising several or more of the steps of:

1. providing a substantially vertical reaction chamber in which a deep porous bed of the prepared fuel is laid in a nearly continuous manner with the top surface continuously contoured with a high central crown, and which has a melting zone in the lower part comprising a cavity in the fuel bed, and a refractory well, 2. including means for moving fuel from the outer portion of the lower zone of the fuel bed toward the melting zone, 3. feeding the fuel into the upper portion of the reactor in a manner that (a) will minimize the infiltration of air or the exfiltration of generated gas and (b) will deliver the fuel in a loose condition where it can be distributed and contoured automatically, 4. supplying oxygen-containing gas into said fuel-bed cavity and melting well in a weight equal approximately to one pound of oxygen per 24,000 to 32,000 Btu of heating value of the fuel charged, 5. thermally decomposing the organic matter in the fuel bed by generating hot gases in the lower part of the fuel bed through the chemical reaction of oxygen with carbon of the lower fuel bed and the cavity wall, followed by destructive distillation and chemical reaction as the gas flows upward through the fuel bed, 6. drying the fuel in the upper portion of the fuel bed and increasing the temperature of the fuel moving downward by absorbing heat from the gases moving upward in the fuel bed, 7. discharging the gaseous products produced in said reactor, which products include among other minor products, $CO_2$, $CO$, $H_2$, $CH_4$, $C_2H_4$, $C_2H_6$, $N_2$, water vapor, condensible organic acids, heavy hydrocarbons, small particles of refuse, carbon and ash dust, 8. discharging fluid slag and metal from the well and permitting them to solidify, 9. passing the reactor product gas through a heated converter so as to cause the reactor products from the upper zone to react among themselves for the purpose of converting the non-gaseous components into fixed gases, and especially to increase the amount of $CH_4$, $C_2H_4$, and $C_2H_6$, 10. utilizing part of the product gas in burners to supply heat for the converter, 11. cooling the converter output gas stream in a heat exchanger that also preheats the air for the burners of the converter, thus reducing gas consumption and increasing efficiency, 12. cooling and cleaning the product gas by water sprays and scrubbing with water, 13. reducing the moisture content of the cleaned gas by cooling and hence condensation, 14. treating organic and inorganic byproducts recovered from the cleaning and cooling of the gas, so as to separate them from water and recycle them into the fuel for the reactor, and 15. removing compounds containing sulfur and chlorine from the product gas by chemical means.

The advantages resulting from this invention include the following:

The product gas will supplement the limited supplies of natural gas, fuel oil, and high quality coals.

Municipal, commercial and industrial wastes consumed will alleviate the need for large sanitary landfill disposal of raw refuse.

A dense, sterile residue is produced from the inorganic matter in the refuse and fossil fuels charged. The residue may be used for asphalt and concrete paving, cinder blocks, brick manufacture, and as a clean fill material.

Waste oils, fats, high-sulfur oils and coals, as well as sludges, may be converted into useful gas, and the sulfur may be removed from the gas before the gas is burned. Similarly, chlorine in fuels charged may be converted into HCl and removed from the gas before the gas is burned.

The process of the invention produces less air pollution than direct incineration or burning of solid and waste fuels, because the product gases are not released to the atmosphere, but rather are recovered as useful products.

THE DRAWINGS

FIGS. 6A to 6D, inclusive, are schematic cross-sectional views in plan of the reactor, showing, respectively, four different methods for moving fuel inwardly from the periphery of the lower part of the fuel bed.

Figures 1, 2:
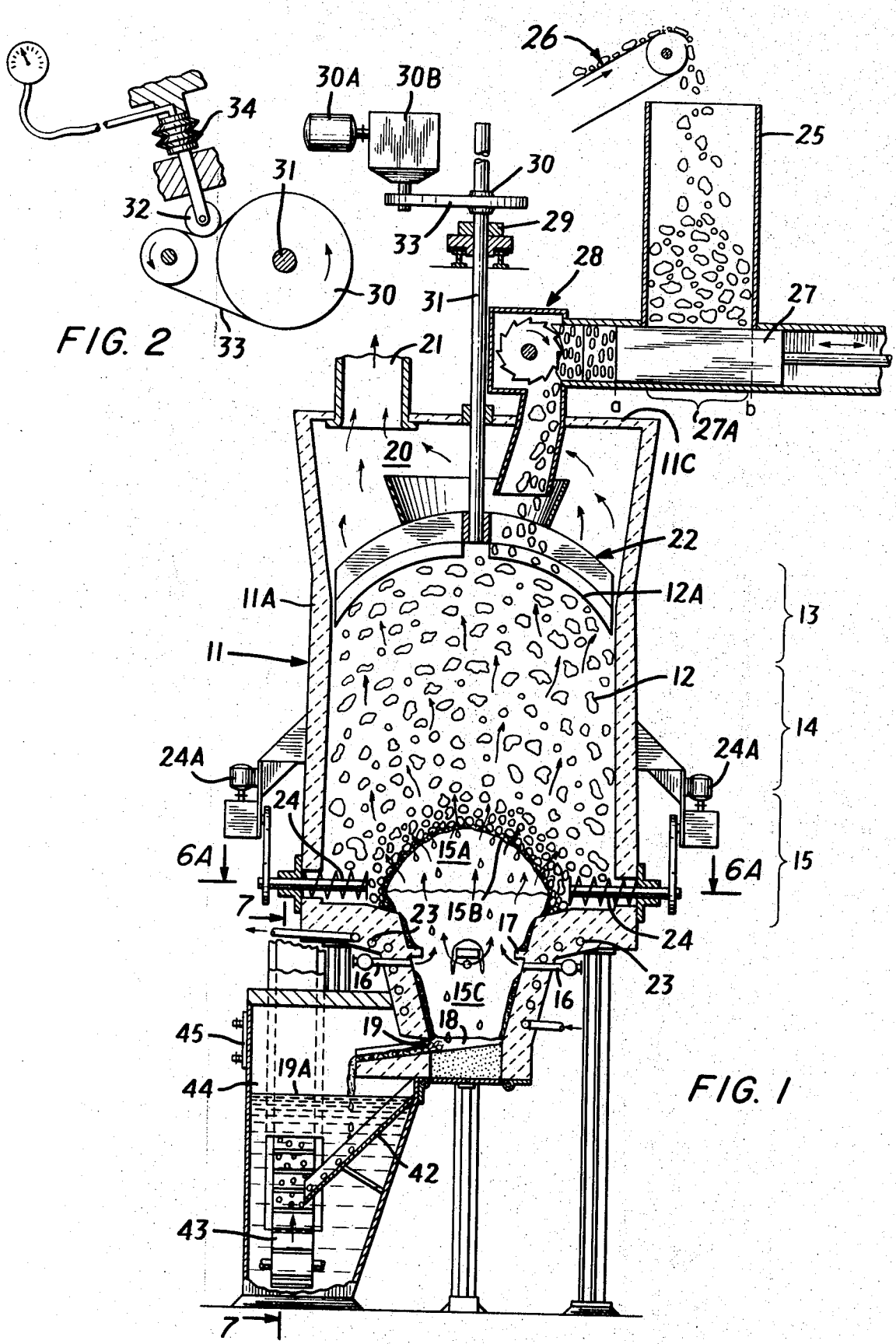
FIG. 1 is a schematic cross-sectional view in elevation of the reactor (furnace) and associated equipment useful in the practice of the present invention.
FIG. 2 is a schematic plan view of the torque-sensing device and pressure gage for monitoring the resistance to turning of the fuel distributor shaft.
Figure 7:
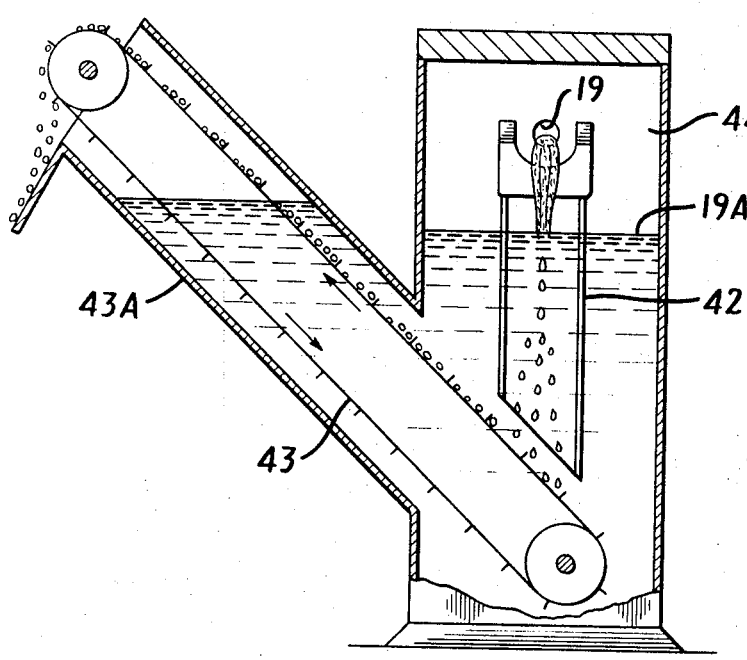

FIG. 7 is a cross-sectional view on plane 7—7 of FIG. 1 in elevation of the residue-removal conveyor, enclosure, and water seal.

Figure 8:
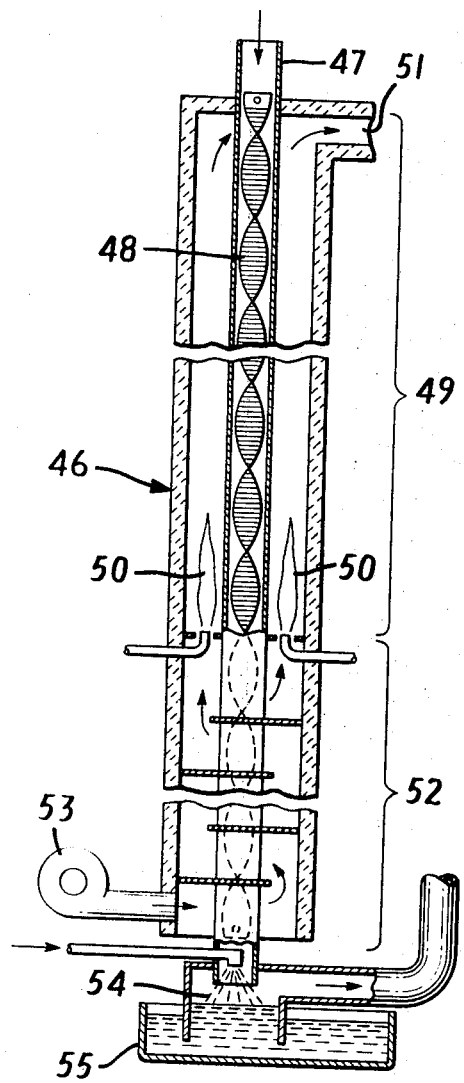

FIG. 8 is a schematic cross-sectional view in elevation of one design of gas converter, with single tube, as useful in the practice of the present invention.

Figure 9:
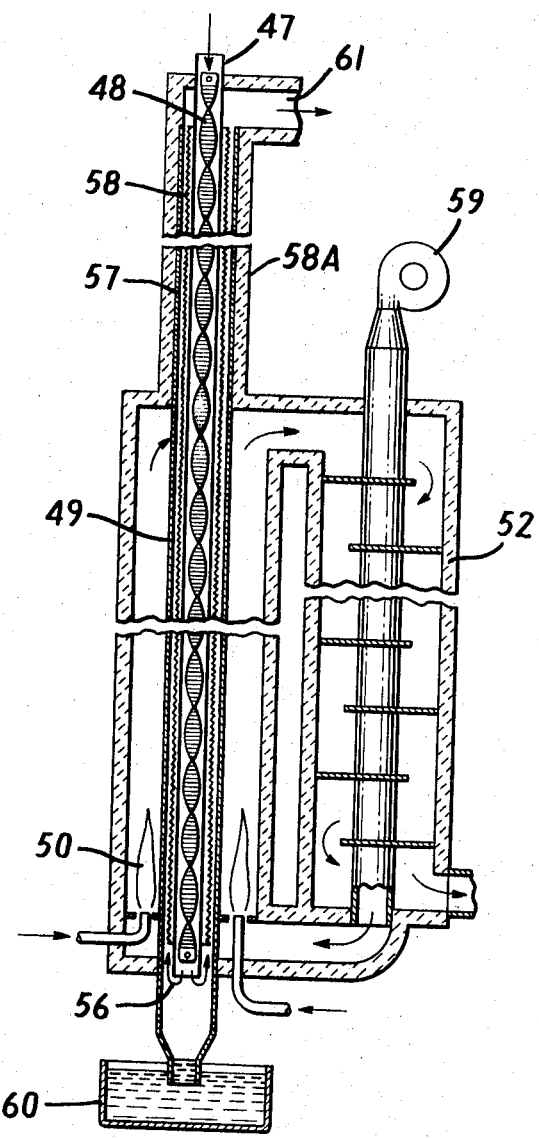

FIG. 9 is a schematic cross-sectional view in elevation of a preferred form of gas converter, with concentric tubes, as useful in the practice of the present invention.

Figure 10:
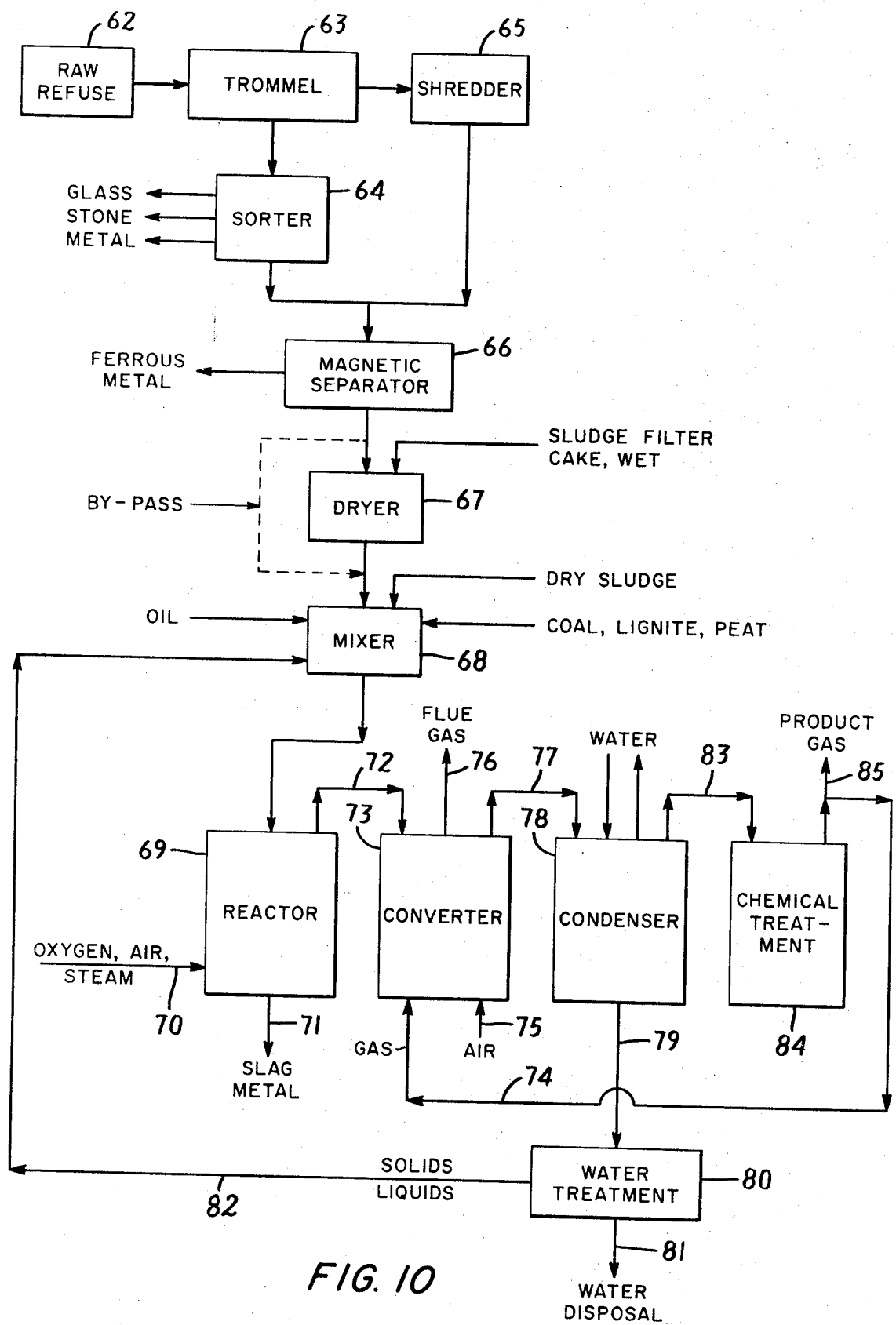

FIG. 10 is a schematic diagram illustrating the total refuse and/or fuel gasification system embodying the present invention.

DETAILED DESCRIPTION OF THE INVENTION

Referring to FIG. 1, there is shown a cylindrical furnace, henceforth called "reactor" 11 containing a deep fuel bed 12, the upper zone 13 of which may be considered to be the drying zone, the middle zone 14 of which may be considered to be a thermal reaction zone, and the lower zone 15 of which may be considered to be a high temperature combustion and melting zone. Zone 15 is characterized by a distinct arched cavity 15A whose domed roof 15B is carbonized hot fuel and inorganic matter, the latter being in a molten or near molten state. Below the cavity there is a refractory-lined zone 15C with admission ports 16 for gaseous oxygen, ledges 17 to divert slag from the oxygen ports, and a well 18 to collect molten slag and metal, together with a tap hole 19 for draining the molten products from the reactor.

Above the fuel bed a gas-disengaging space 20 is provided and a gas exit port 21 for the continuous removal of the gaseous products. Also above the fuel bed, a fuel distributor 22 is rotated on a vertical axis central to the reactor. The fuel distributor is designed to receive fuel from above and to distribute it over the cross-sectional area of the reactor and to contour the top surface 12A of the fuel bed into an essentially hemispherical form or dome-shape, thus doubling the gas-disengaging surface of the fuel bed from that of a plane surface.

Reactor 11 may be constructed of a cylindrical metal shell or of two truncated conical shells joined as shown in FIG. 1. The shell is lined with refractory 11A to withstand elevated temperatures and wear. Insulation may be provided between the shell and the refractory. The bottom of the reactor is lined with refractory and is cooled at the lower side by suitable means, such as a spiral coil 23 of tubing through which air, water, or other fluid is flowed. The purpose of said cooling is to control and limit solution of the refractory by the molten slag. The top of the reactor 11C is constructed of metal and is lined with heat- and corrosion-resistant material, such as castable refractory.

The fuel bed 12 settles by gravity during operation. To facilitate settling and simultaneously to restrict the lateral growth of the cavity 15A, a multiplicity of screws 24 is spaced around the reactor to move fuel from the periphery of the fuel bed toward the cavity. The screws are rotated by suitable drives 24A.

Fuel is delivered to the hopper 25 by suitable means, such as the conveyor 26. The ram 27 reciprocates between limits $a$ and $b$, first, to allow the ram box 27A to be filled with loose fuel, secondly, to compress and thereby to de-air the fuel into a relatively non-porous bundle reducing the voids and passages between the particles, and thirdly, to move the previously formed fuel bundle into a feeder 28 where the particles of compressed fuel are disengaged and dropped on top of the fuel distributor 22. Thus, fuel with a minimum air content is fed into the reactor without air infiltration or gas exfiltration, a desirable design feature, as gas pressure above the fuel bed may be slightly more or less that atmospheric. Air infiltration would reduce gas quality, while gas exfiltration would cause health hazards as well as reduce the quantity of product gas.

The shaft 31 on which the fuel distributor 22 is mounted, is driven by the motor 30A working through the gear box 30B, the chain or belt 33 and the sprocket or sheave 30. The fuel distributor 22 may be raised or lowered to change the depth of fuel bed by loosening the collar 29 and sprocket 30 and sliding the shaft 31 up or down as may be found best for the specific fuel mixture used.

FIG. 2 illustrates a device for sensing the torque of the shaft 31 and sending a signal to the reactor operator and for controlling the fuel feed rate. When the feed rate exceeds the gasification rate, the fuel bed will tend to build up and the resistance to turning of the fuel distributor 22 will increase. Conversely, when the gasification rate exceeds the feed rate, the fuel bed will lower away from the distributor, leaving a gap of loose fuel, and offering little or no resistance to rotation of the fuel distributor. An idler sprocket 32 engages the tension side of the drive chain 33 for the fuel distributor. The idler sprocket 32 is free to rotate but is otherwise restrained to move laterally by guides. The force exerted by the chain 33 against the sprocket 32 is transmitted to the metal bellows 34 which is filled with a liquid capable of actuating a pressure gage and other sensing devices that respond to the change in pressure caused by the change in chain tension, the latter in response to the change in resistance to rotation of the fuel distributor 22. In response to the signal, the feed rate can be increased by more frequent strokes of the ram 27, or the feed rate can be decreased by less frequent strokes of the ram 27. The device will also be useful to the operator should he decide to compact the fuel bed more or less than previously, as by operating with a higher or lower torque of the shaft 31, respectively.

Figure 3:
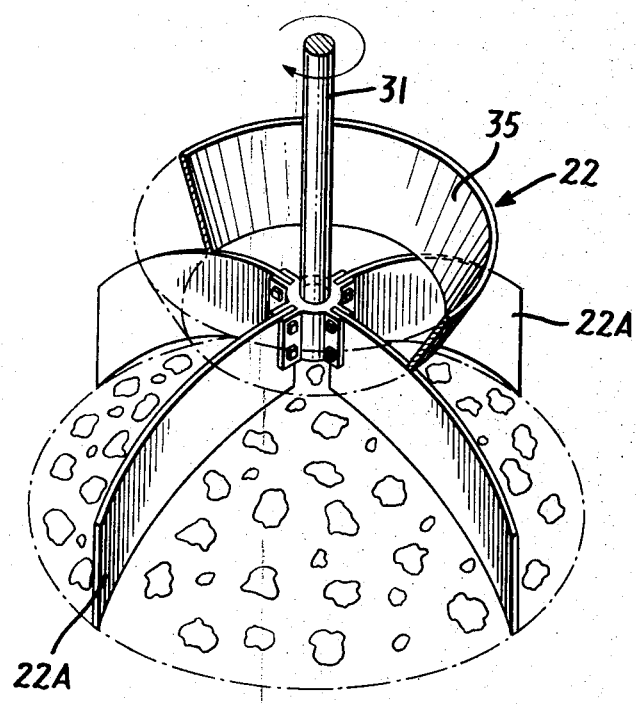
FIG. 3 is an isometric view of the fuel distributor with vertical scraper surfaces.

FIG. 3 is an isometric view of one form of fuel distributor 22, in which four radial blades 22A with vertical surfaces are fastened to a central shaft 31. A frustro-conical funnel 35 above the blades and fastened to the blades serves to guide the fuel to the central zone of the fuel distributor, from which zone fuel moves outward in spiral fashion with particles falling into place on the surface of the fuel bed 12A where space is available. The funnel 35 adds rigidity to the assembly and aids the blades to resist bending.

Figure 4:
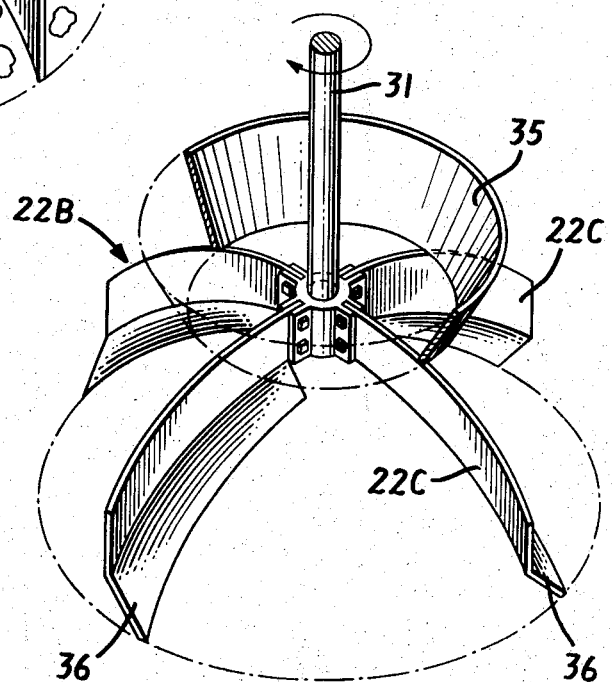
FIG. 4 is an isometric view of the fuel distributor with inclined blade surfaces.

FIG. 4 is an isometric view of another form of fuel distributor 22B, in that four radial blades 22C with inclined surfaces 36 are fastened to a central shaft 31. The inclined surfaces 36 exert both a horizontal and vertical force to fuel particles, of which the latter tends to compact the fuel into the fuel bed more than does the fuel distributor in FIG. 3.

Figure 5:
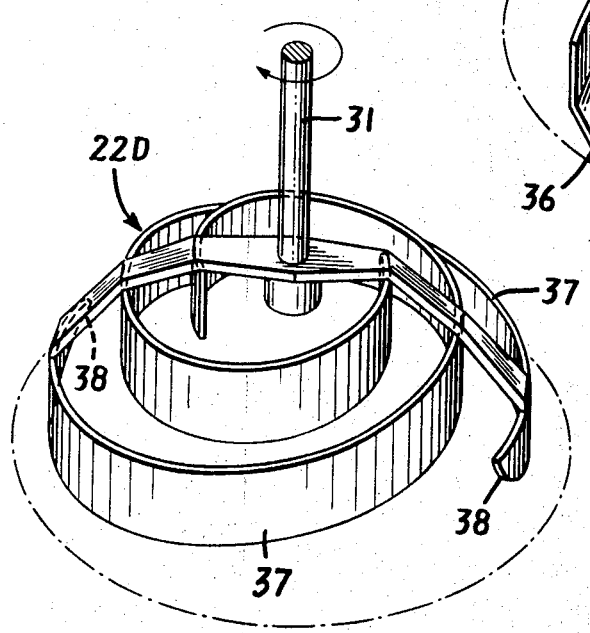
FIG. 5 is an isometric view of the fuel distributor with two spiral blades.
Figure 6A:
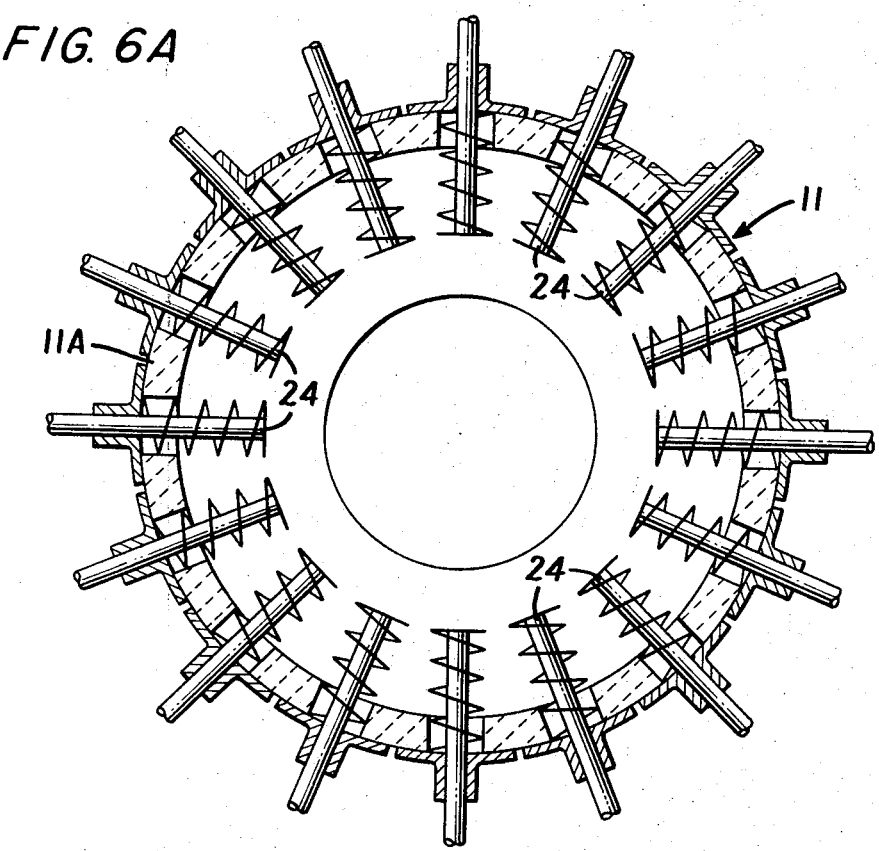
Figure 6B:
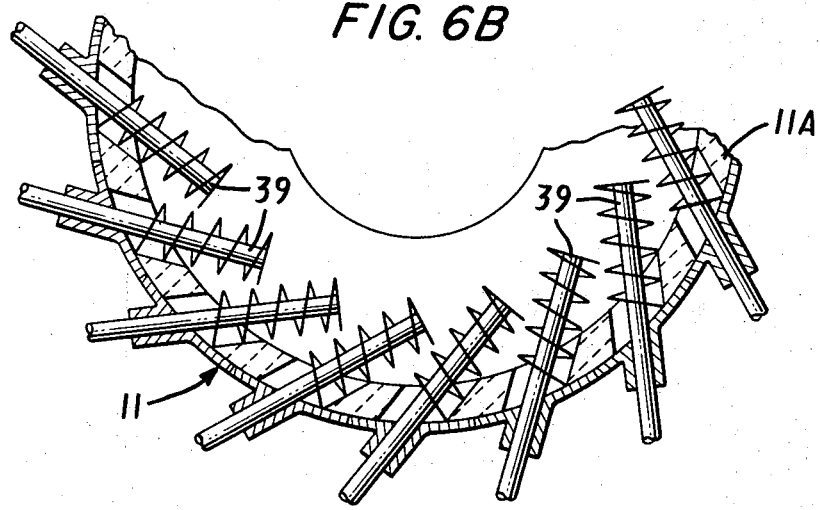
Figure 6C:
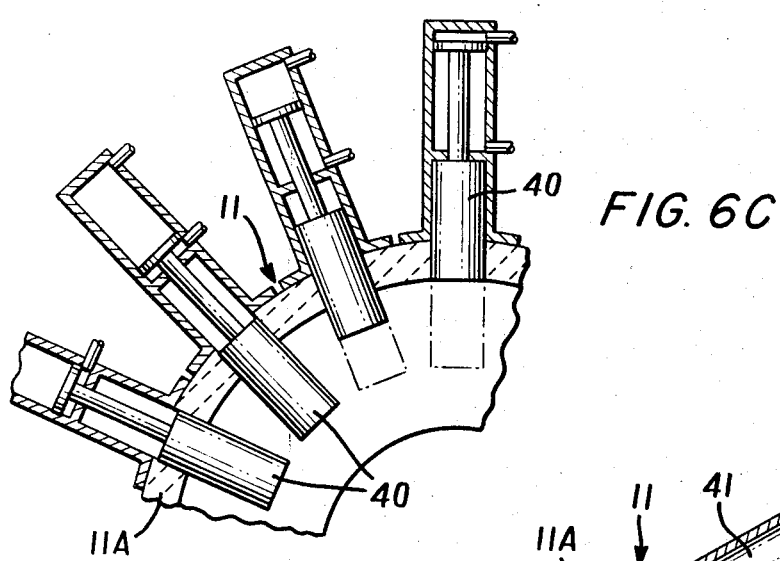
Figure 6D:
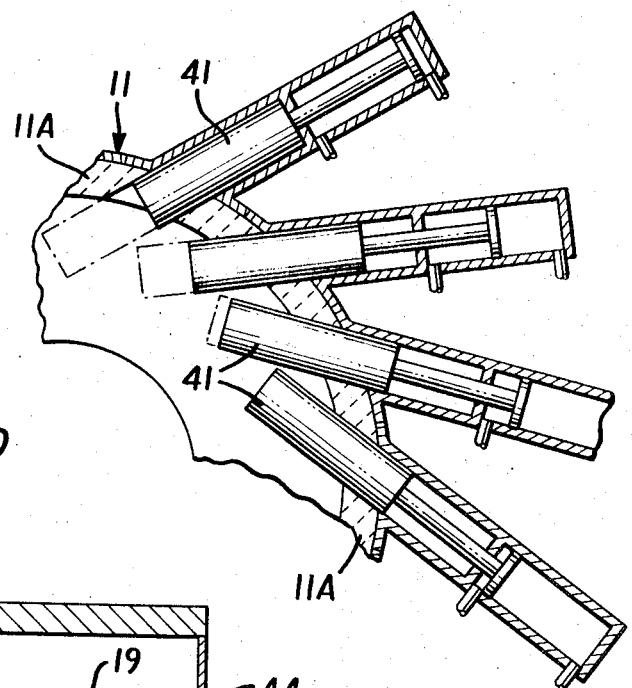

FIG. 5 is an isometric view of another form of fuel distributor 22D, in which two spirally curved blades 37 are fastened to a central shaft 31 by means of a cross arm. The outer ends of the spirals 38 are curved in the vertical direction to ride over and to compact fuel at the outer periphery. Fuel charged from above into the spiral would be carried around and inward until fitted into the fuel bed surface. The bottom edges of the spirals 37 form a fuel bed of crowned cross section of the same hemispherical shape as done by the other fuel distributors.

FIG. 6 is a plan view of the cross section of the retort 11 taken at the centerline of the screws 24. FIGS. 6A to 6B, inclusive, show four alternative methods for achieving the objective of moving fuel toward the central cavity of the fuel bed from the lower periphery. The screws 24, radially oriented, as shown in FIG. 6A, are one alternative. The number of such screws around the periphery of the retort must be sufficient to prevent columns of fuel in the spaces between the screws from supporting the weight of the fuel bed and thereby preventing the fuel bed from settling under control of the screws. The multiplicity of screws 39 shown in FIG. 6B is an alternate arrangement that would accomplish the same purpose. The axes of the screws 39 are tangents to an imaginary circle inside the retort 11. Another suitable alternative is an arrangement of radial rams 40, shown in FIG. 6C being actuated hydraulically. The rams 40 may be cylindrical, square, or rectangular in cross section. In another arrangement, shown in FIG. 6D the rams 41 are shown in a pattern similar to the arrangement for screws 39.

Both rams and screws must operate without significant leakage of gas from inside of the retort where the gas pressures will be above atmospheric pressure. Rams have an advantage over screws in more positive fuel movement. Also, rams can be fully retracted from the fuel bed. screws are simpler than rams and easier to seal at the bearings. The shafts for the screws may be hollow tubes with sight ports of glass at the outer ends for sighting the presence or absence of incandescent fuel at the inner end of each screw. Thermocouples may also be inserted into the hollow shafts to sense the temperatures so that the screws may be rotated faster if necessary to push hot fuel inward with colder fuel from the periphery. The choice of screws or rams will depend on the performance characteristics of the retort with various fuel combinations and with various rates of operation.

As shown in FIG. 7, as the molten slag and entrained molten metal flow out of the tap hole 19, the slag falls into water at 19A, where the slag is chilled and where it decrepitates into granules, with the metal, if any, in the form of globules. These solids sink, slide down the chute 42, and are deposited on the slag conveyor 43. The conveyor elevates the slag out of the water and drops it into a vehicle for removal. The enclosure 44 is gas and water tight, and includes an observation door 45 (FIG. 1). The door is opened when it is necessary to reopen a plugged tap hole 19. Elevated pressure in the enclosure 44 causes the water level to rise in the conveyor boot 43A. The water level in the enclosure 44 is held within limits so that the water seal at the conveyor boot is maintained despite fluctuations in gas pressure within the lower part of the reactor 11.

FIG. 8 is an elevation view in cross section of the converter 46 through which the product gas from the reactor 11 is passed for the purpose of further gasification of tars, oils, acetic acid, organic particles, and other volatilized matter that was not in the form of fixed gases when leaving the reactor. Reactor gas enters the tube 47 at the top, flows past a helical metal element 48, which may be corrugated traversely, and leaves at the bottom. A multiplicity of such tubes operating in parallel may be used in practice. In the upper portion 49 heat is transferred to the tube and the gas flowing in it, the gas temperature being raised in the range of 1,000° to 1,700°F. Heat for the purpose may be provided in any of several ways, as by gas flames 50, the exhaust from which is vented at the port 51. In the lower portion 52 of the converter, the tube and gas are cooled partially by ambient air supplied by the blower 53. Air thus heated is supplied to support the combustion of the gas flames 50. Gas emerging at the bottom of the tube 47 is cooled further by the water spray 54, which spray also traps solids and unconverted tars, transferring the trapped solids and tars to water in the tank 55.

FIG. 9 is a preferred form of converter, also shown in vertical section. The left half of FIG. 9 shows the converter proper 49, the right half shows the air preheater 52. Reactor output gas enters the tube 47 at the top, flows past helical metal element 48, reverses direction at 56 and flows back upward between tube 47 and tube 57. Elements 58 such as screening or helical wire between tube 47 and tube 57 assist heat transfer by disturbing the gas flow and promoting turbulence. Heat is supplied to tube 57, and indirectly to tube 47 by suitable means, such as gas flames 50. Ambient air to support the combustion of the gas flames is supplied by blower 59 and preheated by heat transferred by flue gas from the converter 49. It will be noted that the concentric tubes 47 and 57 extend beyond the flame gas passage into section 58A, where the incoming gas from the reactor 11 is preheated by the cooling of the converter output gas. Below location 56 there is a dropout trap for solid particles as well as a water seal 60. Solids are precipitated into the water and are removable without disturbing continuous operation of the converter. Converted gas exits at port 61.

FIG. 10 is a schematic flow diagram illustrating a total system embodying the present invention. Raw refuse 62 is received and stored, after which is is fed into trommel 63, which has openings about 6 inches square or round over its cylindrical surface. As trommel 63 rotates the minus 6-inch material falls through the openings, while the oversized material is moved into the shredder 65. The underflow from trommel 63 passes into sorter 64, which is either a ballistic or air classifier. High-density material, such as glass, ceramics, stones, and metal are separated from the low-density refuse, such as paper, film, grass, leaves, and other organic matter. the shredder output is approximately minus 6-inch material. The shredder output and the low-density sorter output are combined and passed through the magnetic separator 66, which removes pieces of ferrous metal, such as iron and steel.

The non-magnetic refuse from separator 66 is conveyed to the dryer 67. Sewage or other organic sludge filter cake also enters the dryer 67 with the said refuse, and together they are reduced in moisture content to some optimum economic level, such as 10 percent. The dryer may be of the rotary kiln type, or pneumatic transport type with refuse in suspension in hot gas, or other type. If desired, part or all of the material may bypass the dryer. The partially dried refuse is next fed into a mixer 68 where any, all, or none of several fuels may be added: Oil, coal, dry sludge, lignite, peat, pitch, and many other organic materials. The proportions of these combustibles must be kept within limits, as discussed below under FUEL SUITABILITY AND PREPARATION. The mixed fuel is fed to the reactor 69. Oxidant gas 70 is also supplied to reactor 69. Products removed from the reactor in steady streams are slag and metal 71 and gas 72 together with ungasified entrained solids and liquids (fog). Product 72 is piped to converter 73 in which it is heated to continue gasification reactions. Gas 74 and air 75 are supplied for generating heat for operation of the converter. The combustion of gas 74 and air 75 results in flue gas 76 which is vented to the atmosphere or used in dryer 67. Converter 73 preferably includes a heat-exchanger section in which air 75 is preheated by partially cooling flue gas 76.

Converter output gas 77 is piped to condenser 78 where gas 77 is cooled indirectly by water circulated through the condenser. The condensed water, together with organic compounds, solids and liquids removed by the condenser, are discharged via pipe 79 to water treatment 80, where the condensate water is clarified and otherwise treated to separate contaminants from the water prior to its discharge to water disposal 81. The liquids and solids 82 removed from the condensed water are recycled to mixer 68 as they can be converted to product gas and slag. The output gas 83 from condenser 78 is piped to chemical treatment 84 where undesirable constituents are removed as may be necessary, such as the removal of $H_2S$ by iron oxide, by means of methods well known in the art. The final product gas 85 is readly for transmission, storage, and use.

The following example will illustrate with quantitative results the effectiveness of the present invention for producing a combustible gas from a mixture of non-gaseous fuels. The invention was demonstrated in a laboratory-scale reactor of 10-inch diameter and an electrically heated single-tube converter 3 inches in diameter by 9 feet long. The fuel was a mixture of 80 percent dried household refuse without metal, glass or stones, shredded to pass through ¼-inch openings, 10 percent residual fuel oil, and 10 percent bituminous coal under 10 mesh. The composition of the fuel was as follows:

|  | Weight percent |
|---|---|
| Moisture | 4.12 |
| Carbon | 51.61 |
| Hydrogen | 6.29 |
| Oxygen | 29.23 |
| Nitrogen | 0.79 |
| Sulfur | 0.36 |
| Chlorine | 0.56 |
| Ash | 7.04 |
| Total | 100.00 |

The refuse gasification rate was 6.6 pounds per hour. Air and oxygen were supplied to the reactor so as to deliver 1.76 pounds of oxygen and 0.81 pounds of nitrogen per hour. The average temperature of the gas leaving the reactor was 356°F. The gases were heated to an average of 1,449°F in the converter. The analyses of the gases leaving the reactor and leaving the converter follow:

| | Volume percent, dry basis | |
|---|---|---|
| | Reactor Gas | Converter Gas |
| Carbon monoxide | 37.51 | 38.23 |
| Hydrogen | 21.51 | 17.36 |
| Methane | 7.72 | 10.28 |
| Ethane, higher hydrocarbons | 0.81 | 1.07 |

-Continued

Volume percent, dry basis

|  | Reactor Gas | Converter Gas |
|---|---|---|
| Ethylene, acetylene | 6.08 | 7.85 |
| Carbon dioxide | 13.96 | 14.13 |
| Oxygen | 1.94 | 0.80 |
| Nitrogen | 9.97 | 9.79 |
| $H_2S$ and HCl (probable values) | 0.50 | 0.49 |
| Totals | 100.00 | 100.00 |

A pool of molten ash was formed below the central fuel-bed cavity.

The volume of the dry gas from the converter was 117.9 cu. ft. per hour at 60°F, 30 in. Hg barometric pressure, and the higher heating value of the gas was 431 Btu per cu. ft. The volume of the dry gas from the reactor was 115.8 standard cu. ft. per hour, and the higher heating value of the gas was 381 Btu per cu. ft. Water condensed from the converter output gas was 1.0 pound per hour.

OXYGEN CONTAINING GAS

Commercially pure oxygen contains about 95–98 percent $O_2$ and this is the preferred material for use in the present invention because it produces the highest quality of product gas consistent with reasonable costs. One may, however, if desired, use gas with a lower oxygen content, even air, if larger quantities of diluent or inert gas such as nitrogen can be tolerated providing the oxygen-containing gas is preheated sufficiently so that a sufficient quantity of heat can be put into the system to melt any inorganic material present, such as slag-forming ceramics and metals.

FUEL SUITABILITY AND PREPARATION

The gasifer is designed to gasify solid organic matter that is initially sized so as to form a fuel bed of controlled porosity, without large channels or formations too impervious to gas flow. The objective of the fuel selection and sizing is to achieve an acceptable measure of uniformity of gas quality, steady pressure loss through the fuel bed between the top and bottom of the fuel bed, and steady gas production volume. A fuel bed of large pieces alone, such as cardboard boxes, tires, firewood, and broken furniture causes channels through which oxygen and other gases flow without sufficient heat exchange with the solid fuel or gasification reactions. A tight formation, such as packed grass, fine sizes of coal, or concentrations of plastic film, is not sufficiently porous and would therefore cause the upward gas flow to be diverted without effective heat transfer and chemical reaction. Tight formations increase the resistance of the fuel bed to flow of gas for a given rate of oxygen supply.

Mixed household refuse is a suitable fuel provided that the larger pieces are reduced in size equal to approximately 1/20th of the diameter of the retort. This fuel is improved by reducing the moisture content from a nominal 25 percent to 10 percent or less. The removal of metal also beneficiates the fuel as metal consumes oxygen and produces no gas. Glass, ceramics and stones are useless to the process and merely increase the slag volume, with some loss of useful heat. While metals and inorganic matter in the fuel can be processed, the fuel is beneficiated by their prior removal.

Industrial waste consisting of paper products, wood, sawdust, food waste, leather, rubber, plastics and textiles are normally suitable, with the same provisos as for household waste.

Commerical waste, as from mercantile establishments, offices, hospitals, hotels, motels, and retail stores, are normally suitable, with the same provisos as for household waste.

Sylviculture wastes, such as chipped wood and bark, brush, and ripe leaves are suitable fuels, provided that the size limits are observed and the moisture contents are reduced below 40 percent.

Sewage filter cake is a suitable fuel if predried to a 40 percent moisture content, or if mixed with a high proportion of other dry wastes.

Generally, the waste or refuse material used in the present invention contains about 30 to 65 percent carbon on a dry basis, exclusive of inorganic material, such as ceramics (e.g. glass) and metals, but inclusive of the normal ash content of the organic material.

Bituminous coal, lignite, anthracite, coke, coal tar, and pitch are suitable fuels when mixed with cellulosic wastes (wood, paper products, cotton fabrics) in a ratio that will not cause excessive resistance to gas flow because of melting. Such fuels may be used alone, that is, without being mixed with wastes, providing they do not cause problems from melting upon heating.

Petroleum products are suitable fuels when mixed with absorbent solids, such as paper products, wood chips, dry sewage sludge, leather, textiles and sawdust. One part of heavy fuel oil mixed with eight parts of cellulosic waste and one part of bituminous coal is a satisfactory mixture.

In the preparation of fuel for the gasification reactor, it is desirable that the proportion of particles of under 1/8 inch be kept to a minimum. The addition of heavy petroleum oil to the fuel mixture has the effect of agglomerating fine particles and attaching them to larger particles, thus reducing the amount of fine particles entrained by the gas stream which leaves the reactor. Similarly, tars, oils, and carbonaceous solids cleaned from the gas may be introduced into the reactor as a mixture with the main fuel stream.

In an updraft gas producer the evaporation of moisture from the fuel reduces the product gas temperature, as is well known in the art. This moisture passes through the converter and must be removed if the gas is to be used at ambient temperature. Because the condensed water will contain organic and odorous compounds that must be removed before the water can be introduced into the environment via drains, sewers and streams, it is advisable that the volume of water condensed be minimized, as by predrying of the solid fuel. Predrying and slight preheating of the fuel have the additional benefit of reducing or eliminating condensation of acidic moisture in the upper part of the reactor, above the fuel bed. The resultant elevation in temperature of the reactor exit gas reduces the amount of fuel consumed to elevate the gas temperature in the converter. Likewise, a reduction in the moisture of the gas reduces the fuel consumption in the converter, and reduces the cooling load of the condenser. Dry cellulosic fuel contains chemically bound water, which is released by heating of such fuel as it descends in the fuel bed. In addition, some water vapor is formed from the partial combustion of fuel hydrogen, and from unreacted water vapor that may be added with oxygen under the fuel bed.

When the reactor output gas is burned in its raw state, as for boiler firing or for direct firing of process furnaces, moisture in the gas causes a heat loss to the boiler or process by virtue of the sensible heat of the vapor above the temperature of the gas leaving the reactor. This loss is reduced proportionately to the reduction in amount of moisture in the reactor product gas.

Although preferred embodiments of the invention have been described, it is to be understood that recognized equivalents are included within the scope of the appended claims.

I claim:

1. In a process for converting solid fuel to useful gaseous products by providing a substantially vertical reactor containing a deep bed of prepared solid fuel, and feeding a solid fuel mixture containing organic matter in a manner to minimize the infiltration of air or exfiltration of gas and deliver the fuel in a loose condition into the upper portion of said reactor, the improvement which comprises feeding oxygen-enriched gas centrally into the bottom of said fuel bed and upwardly through said bed thereby to maintain combustion in said fuel bed and to form a central cavity maintained at combustion temperatures in the fuel bed and to form combustible product gases which flow from the top of said bed, forcing radially inwardly the lower portions of the bed by external mechanical means thereby to control and limit the size of said cavity, combusting the carbonized fuel at and near the surface of said cavity, thereby producing hot gases that flow upwardly and outwardly through passages between the fuel particles thus imparting heat to the particles and thermally decomposing the organic matter into gases and vapors, and contouring the top of the bed by mechanical means to a generally dome shape thereby to provide for more uniform flow of gases upwardly through said bed.

2. A process as described in claim 1 wherein the fuel mixture introduced into the reactor contains up to 25 percent of a liquid or meltable fuel.

3. A process as described in claim 1 wherein the fuel feed mixture is compressed by a ram within a compression conduit communicating with the reactor while being introduced into the reactor, thereby to reduce the voids and passages between the particles and thus to minimize air infiltration into the reactor and to minimize exfiltration of product gas from the reactor to the atmosphere.

4. A process as described in claim 1 wherein the fuel mixture contains waste or refuse material having a carbon content of about 30 to 65 percent dry basis.

5. A process as described in claim 4 wherein the inorganic matter, such as glass and metal, is substantially removed from the fuel mixture fed into the reactor before it is introduced into the reactor.

6. A process as described in claim 4 wherein the fuel mixture introduced into the reactor contains inorganic material such as ceramics and metal, which metal is partially oxidized and which ceramics and any remaining metal is melted in the fuel bed of the reactor, and discharging the molten inorganic material from the bottom of the reactor and cooling the same to solidify.

7. A process as described in claim 1 wherein the combustible product gases contain fixed gases, condensable vapors and entrained matter and such product gases are flowed through a tubular converter where said product gases are heated and chemically altered to form a gas of increased calorific value.

8. A process as described in claim 7 wherein the gas from the converter is cooled so as to condense and collect water, tar, organic liquids, and organic and inorganic dusts; and the tar, organic liquids and dusts are removed from the condensed water and recycled to the fuel introduced into the reactor.

9. A process as described in claim 1 wherein the fuel mixture introduced into the reactor is comminuted to particle size no greater than about 1/20 the diameter of the reactor.

10. An apparatus for converting solid fuel to gaseous products comprising a generally vertical reaction chamber adapted to contain a deep bed of prepared fuel, means for feeding a fuel mixture including waste material, in a manner to minimize the infiltration of air and deliver the fuel in a loose condition into the upper portion of said chamber, means for feeding oxygen-enriched gas centrally into the bottom of said fuel bed and upwardly through said bed thereby to form a central cavity maintained at combustion temperatures at the bottom of said fuel bed and to maintain said combustion in said fuel bed and form combustible gases, an array of rams or screws arranged peripherally around the bottom portion of said chamber to force portions of the solid fuel at the lower portions of said bed radially inwardly thereby to control and limit the size of said cavity, mechanical means for contouring the top of said bed to a generally domed shape thereby to provide more uniform flow of gases upwardly through said bed, and pipe means for withdrawing said gases from the top of said reaction chamber.

11. An apparatus as described in claim 10 wherein the means for contouring the top of said bed is an arrangement of laterally extending arms supported from above by a vertical rotatable shaft, said arms defining the upper surface of said bed and said dome shape.

12. An apparatus as described in claim 10 including a slag well mounted centrally below said fuel bed and positioned to collect molten inorganic material formed from inorganic material contained in the fuel mixture fed to the reaction chamber.

13. An apparatus as described in claim 10 including ram means mounted in a conduit communicating with said reaction chamber, said ram means for compressing said fuel mixture being introduced into said reaction chamber and thereby to reduce the voids and passages between the particles and thus to minimize air infiltration into the reactor and to minimize exfiltration of product gas from the reactor to the atmosphere.

14. An apparatus as described in claim 13 including means to disengage the particles of the compressed fuel mixture being fed to the reaction chamber before it reaches said bed.

15. An apparatus as described in claim 10 including a tubular converter communicating with said pipe means for withdrawing said gas from the top of said reaction chamber, and combustion means associated with said converter for indirectly heating and chemically altering the gas to increase its calorific value.

16. An apparatus as described in claim 15 including means for partially cooling the converted gas by indirect heat transfer with combustion air for the heating means for said converter.

17. An apparatus as described in claim 16 including means for further cooling said converted gas by indirect heat exhange so as to condense and collect water, tar, organic liquids and organic and inorganic dusts; and means for recycling the tar, organic liquids and dusts to the fuel fed in the reaction chamber.

18. An apparatus as described in claim 11 wherein screws are used to force the bottom portions of said bed inwardly.

19. An apparatus as described in claim 18 wherein said screws are mounted substantially radially.

20. An apparatus as described in claim 18 wherein said screws are mounted at an angle to the radial direction thereby to impart a significant rotational motion to the fuel mixture in the bed.

21. An apparatus as described in claim 11 wherein ram means are used to force inwardly the fuel mixture in the lower portion of said bed, and said rams are mounted substantially radially.

22. An apparatus as described in claim 11 wherein ram means are used to force inwardly the fuel mixture in the lower portion of said bed, and said rams are mounted on an angle to the radius of said chamber, thereby to impart a significant rotational motion to the fuel in said bed.

23. An apparatus as described in claim 11 wherein the surface of said arms are inclined at an angle to the vertical in a direction away from the direction of rotation thereof, where they contact the upper surface of said bed.

24. An apparatus as described in claim 11 wherein said arms are spirally shaped starting from a location near said shaft and spiraling outwardly to a location near the periphery of said bed.

25. An apparatus as described in claim 11 including torque sensing means for monitoring the resistance to turning of said shaft.

26. An apparatus as described in claim 25 wherein said torque sensing means includes a sheave connected to and rotating with said shaft and a belt means contacting and traveling on the periphery of said sheave or said torque sensing means includes a sprocket connected to and rotating with said shaft and a chain means contacting and traveling on the periphery of said sprocket, said belt having a driving portion contacted by a pressure sensing device, said driving portion being responsive to the resistance to turning of said shaft, and means associated with said driving portion to indicate said resistance to turning.

* * * * *